United States Patent Office 3,702,777
Patented Nov. 14, 1972

1

3,702,777
METHOD FOR CATALYZING POLYUREA COATINGS
James W. Watson, Parma, Ohio, and Billy D. Payne, South Bend, Ind., assignors to SCM Corporation, Cleveland, Ohio
No Drawing. Continuation-in-part of application Ser. No. 724,610, Apr. 26, 1968, now Patent No. 3,560,264. This application Oct. 15, 1970, Ser. No. 81,135
The portion of the term of the patent subsequent to Feb. 2, 1988, has been disclaimed
Int. Cl. B32b *21/08;* B44d *1/28*
U.S. Cl. 117—72     6 Claims

ABSTRACT OF THE DISCLOSURE

A novel method for catalyzing the formation of polyurea by the reactions between polyfunctional-isocyanates and polyfunctional-imines through the presence of an effective amount of lower hydrocarbyl substituted phenolic catalyst is provided. One particularly important embodiment comprises the formation of polyurea film coatings on wood substrates by reacting alkylene diisocyanates and alkylene diimines in the presence of a lower hydrocarbyl substituted chlorophenol.

---

This application is a continuation-in-part application of S.N. 724,610 filed Apr. 26, 1968, now U.S. Pat. 3,560,-264, the disclosure of which is incorporated herein by reference.

This invention relates to catalyzing polyurea coatings. More particularly, this invention pertains to a novel method for catalyzing modified polyurea coatings on treated or untreated wood substrates.

The term "polyurea" is well known in the art and refers to a polymeric condensation reaction product of polyfunctional-isocyanates and polyfunctional-amines. This reaction can be expressed:

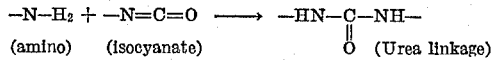

Polyureas are well known for their strength, hardness and chemical durability; but until recently, have not found wide commercial acceptance as coating materials because of the rapid rate of reaction between the polyfunctional-amine and the polyfunctional-isocyanate. In fact, this reaction is so fast that the pot-life is extremely short and gelation often occurs before a commercially acceptable coating can be applied to, and formed on, the substrate.

Recently, a technique has been developed for controlling the reaction between the polyfunctional-amine and polyfunctional-isocyanate by "blocking" the polyfunctional-amine with organic carbonyl compound (an aldehyde or ketone) to form a polyfunctional-imine. This polyfunctional-imine has the functional group

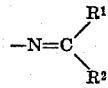

wherein $R^1$ and $R^2$ are hydrogen or hydrocarbyl groups contributed by the aldehyde or ketone. Compounds having the

functional groups are known in the art as "ketimines," and are formed by the reversible reaction:

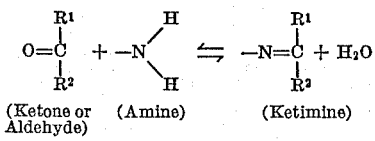

Compounds having two or more functional

are known as "polyfunctional-ketimines." In the presence of water (such as atmospheric humidity), the ketimine linkage hydrolyzes to "unblock" the polyfunctional-amine according to the above reversible reaction. The condensation reaction then takes place between the polyfunctional-amine and the polyfunctional-isocyanate to form the polyurea and the liberated ketone or aldehyde volatilizes from the system. Unfortunately, polyureas formed in this manner often require prolonged curing periods to achieve a tough, hard, glossy, weather-resistant coating.

This invention is directed to a novel and economical method for catalyzing the curing reaction in this polyfunctional - imine/polyfunctional - amine/polyfunctional-isocyanate system to produce hard, tough, weather-resistant, chemically durable, polyurea coatings, using conventional application techniques, and short curing periods at low temperatures.

As used herein, the term "isocyanate" refers to a chemical compound containing one or more $(N=C=O)$ groups.

The "functionality" of a given isocyanate indicates the number of $(N=C=O)$ groups that are present in a molecule of the isocyanate compound. For example, when the isocyanate molecule contains two $(N=C=O)$ groups, it is said to be difunctional. "Polyfunctional" is used to characterize molecules having two or more reactive groups. Similar nomenclature is used in describing the functionality of the imines and amines.

To form a uniform polyurea coating, the isocyanate and the amine must be at least difunctional. Difunctionality tends to produce linear polyureas with minimal cross linking. Such polyurea coatings are tough, hard and weather resistant. When three or more functional groups are present, the degree of structural cross linking increases with increasing functionality. It is known that highly cross-linked polyurea structures are quite brittle and lack toughness. For this reason, difunctional and trifunctional isocyanates and amines are preferred in forming tough, hard polyurea coatings.

Accordingly, the isocyanate is defined as a compound of the formula $R(N=C=O)_x$ wherein R is a saturated hydrocarbyl (e.g., aliphatic, cycloaliphatic or aromatic) group having a valence equal to X wherein X is an integer from 2 to 4 inclusive. Usually, R is alkylene and the isocyanate is a diprimary diisocyanate for the reasons discussed above.

There are numerous compounds within this formula that are suitable for the present purposes and no attempt will be made to present an exhaustive list. The following compounds are considered illustrative and will suggest to those skilled in the art a variety of others: alkylene diisocyanates such as ethylene diisocyanate, trimethylene diisocyanate, tetramethylene diisocyanate, hexamethylene diisocyanate, decamethylene diisocyanate; cyclo-alkylene diisocyanates such as cyclopentylene diisocyanate, cyclohexylene diisocyanates; aromatic diisocyanates such as m-phenylene diisocyanate, naphthalene diisocyanate, diphenyl-4,4'-diisocyanate; aliphatic-aromatic diisocyanates such as tolylene-2,4-diisocyanate, tolylene-2,6-diisocyanate, xylene-1,4-diisocyanate, diphenylene methane diisocyanate; and isocyanates having three or more isocyanate groups such as butane-1,2,2-triisocyanate, benzene-1,3,5-triisocyanate, diphenyl-2,2,4-triisocyanate, diphenyl-4,6,4'-triisocyanate, toluene-2,4,6-triisocyanate, ethyl benzene-2,4,6-triisocyanate, and triphenyl methane-4,4,4',4"-triisocyanate.

As mentioned above, these polyfunctional-isocyanates react with the polyfunctional-amines to form polyureas according to a rapid reaction. To control this reaction, the polyfunctional-amine is mixed with polyfunctional-isocyanate in the form of a polyfunctional-imine ("carbonyl blocked" polyfunctional-amine formed by reacting the polyfunctional-amine with a ketone or aldehyde). Typically, an alkylene diimine (formed from an alkylene diamine) of the formula is employed:

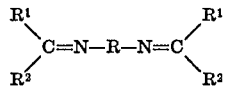

In this formula, $R^1$ and $R^2$ have the meanings assigned above, and R has the meaning assigned hereafter. Suitable polyfunctional-imines are available commercially. These polyfunctional-imines while in physical admixture with the polyfunctional-isocyanate readily hydrolyze, in situ, under ambient humidity conditions, to form the free polyfunctional amine and to free ketone. The free polyfunctional-amine is then available to react with the polyfunctional-isocyanate to form the polyurea.

The polyfunctional-imines can be described as the reaction product of an amine of the formula $R(NH_2)_x$ wherein R is a saturated hydrocarbyl (e.g., aliphatic, cycloaliphatic or aromatic) group having a valence equal to X wherein X is an integer from 2 to 4 inclusive; and a ketone or aldehyde. The hydrocarbyl groups associated with the ketone or aldehyde are not important since these groups do not enter into the reaction. Lower ketones and aldehydes are generally used because these compounds are readily volatilized during the coating curing period.

In the above formula, R is usually alkylene, and the polyfunctional-amine is a primary diamine for the reasons discussed above. Suitable primary diamines include ethylenediamine, tetramethylenediamine, pentamethylenediamine, hexamethylenediamine, heptamethylenediamine, octamethylenediamine, p-xylylenediamine - 1,4 - diaminocyclohexane, p-phenylenediamine, 1-methyl-2,4-diaminobenzene, bis (p-aminocyclohexyl) methane and the like. Other polyfunctional-amines include butane-1,2,3-triamine, diphenyl-2,2,4'-triamine and so on.

According to the present invention, the curing reaction between polyfunctional-isocyanates and polyfunctional-amines (which are liberated by the in situ hydrolysis of polyfunctional-imines) is catalyzed by the presence of a small amount (up to about 5% by weight) of phenolic compound selected from the group consisting of lower hydrocarbyl substituted phenols, lower hydrocarbyl substituted chlorophenols and mixtures thereof.

The term "lower-hydrocarbyl" as used herein, means hydrocarbyl radicals derived from hydrocarbons having from one to eight carbon atoms by removal of one hydrogen atom, such as alkyl, alkenyl, alkynyl, cycloalkyl, cycloalkylalkyl, phenyl, alkylated-phenyl, benzyl or phenethyl, as further illustrated by methyl, ethyl, n-propyl, isopropyl, 2-butyl, isoamyl, n-hexyl, and the like, when alkyl; ethenyl (vinyl), 2-propenyl, 3-butenyl, 2-hexenyl, and the like, when alkenyl; 2-propynyl (propargyl), 3-hexynyl, and the like, when alkynyl; cyclopropyl, cyclobutyl, cyclopentyl, cyclohexyl, cyclooctyl, and the like, when cycloalkyl; cyclopropylmethyl, cyclopropylethyl, cyclopentylmethyl, cyclohexylmethyl, cyclohexylethyl, and the like, when cycloalkylalkyl; 2-methylphenyl, 4-methylphenyl, 2,4-dimethylphenyl, 3-ethylphenyl, and the like, when alkylated-phenyl.

The term "lower-hydrocarbyl substituted phenols" is used herein to embrace phenols, and phenolic compounds wherein one or more hydrogen atoms of the phenyl nucleus is replaced by a "lower hydrocarbyl" as defined above. Thus, for example, the nucleus can be alkylated with methyl or other alkyl group, having not more than 8 carbon atoms. The term "lower hydrocarbyl substituted chlorophenols" has the same meaning as "lower substituted phenols" except that one or more of the hydrogen atoms of the phenyl nucleus is replaced with chlorine in addition to the lower hydrocarbyl substitution. For efficiency and economy, it is usually preferred to limit the total number of substituents, including hydroxyl groups to not more than four, as excessive substitution can detract from the catalytic influence due to steric hindrance.

Suitable hydrocarbyl substituted phenols include ortho, meta and paraphenyl phenol, orthobutyl phenol, m-butylphenyl, cyclopentylphenol, orthoethylphenol, methylphenol (cresol), propylphenol (thymol), creosote (mixture of cresol), oxycresol, methyl cresols and other phenols), phenylmethyl phenol, butyl phenol, benzyl phenol, hexyl phenol, propenyl phenol, 2-methylphenyl phenol, methyl cyclopropyl phenol and so on. Suitable hydrocarbyl substituted chlorophenols include 2-chloro-4-phenylphenol; 4-chloro-2-cyclopentylphenol; 4 - chloro-2-phenylphenol; 6-chloro-2-phenylphenol, propyl chlorophenol; 4-chloro-2-methyl-6-cyclopentylphenol chlorocresol, chlorothylmol, chlorophenylmethyl phenol and the like.

Particularly preferred for catalytic efficiency and economy in addition to fungicidal activity on the wood substrate are the lower hydrocarbyl substituted phenols and chlorophenols where the lower hydrocarbyl groups are phenyl, cyclopentyl or alkyl (i.e., methyl, ethyl, propyl, butyl and so on) and mixtures thereof.

These compounds are particularly important because many of them are known preservatives for wood and other cellulosic materials.

Polyurea coatings formed according to the present invention are self-priming and provide the unusual combination of tensile strength, inherent flexibility and extensibility, making them particularly suitable to dimensionally unstable woods such as soft pines, cedar and the like. This polyurea coating is also an excellent exterior coating for various plywood and particle board substrates.

Polyurea coatings formed according to the present invention are useful as protective, abrasion-resistant, chemically durable coatings on a wide variety of substrates. For example, clear polyureas make excellent damage-preventive coatings for glass, wood, metal, ceramic, paper or plastics when transparent, abrasion-resistant coatings are required. Additionally, polyureas can also be pigmented to almost any color and luster to provide protective decorative coatings on substrates such as metal, asbestos, paper, wood, ceramic, etc.

Polyurea coatings find particular utility in the home-building and mill-working industries in that they provide a complete self-priming, finishing system for construction grade woods. This is particularly true in the case of soft woods, such as pine, since polyurea tends to stabilize these soft woods against excessive dimensional change. Polyureas are also excellent coating materials for other cellulosic substrates such as particle board, hardboard and plywood.

The primary advantage of the present invention, however, is the rapid curing of the polyurea coating. Without this phenolic catalyst, curing periods of 2 or 3 hours or longer at temperatures up to 180° F. are common. When the phenolic catalyst is present, the curing period is reduced to about 10–20 minutes under comparable conditions. The advantage of this system can be appreciated when considering the amount of millwork lumber that must be treated and stored in a warehouse while the coating cures.

In practicing the present invention, the polyfunctional-isocyanate and the polyfunctional-imine are mixed together, at room temperature, to form the polyurea coating mixture. In one embodiment, a catalytic amount of a phenolic compound selected from the group consisting of lower hydrocarbyl substituted phenols, lower hydrocarbyl substituted chlorophenols and mixtures thereof is present in an amount corresponding to about 0.1% to about 5% by weight of the coating mixture. Catalyst concentrations in the range of 0.5% to 3% are used in the interest of economic practicality. Standard additives such as pigments, extenders, and fillers can also be incorporated into the coating mixture. If desired, this mixture can be diluted with a moisture-free, suitable solvent (e.g., hexane, heptane, xylene or toluene) to reduce viscosity and improve spreadability. Dilution will also tend to increase the pot-life of the coating mixture.

The polyfunctional-isocyanate, the polyfunctionalimine, and the phenolic catalyst can be mixed in the mixing nozzle of a multicomponent spray gun at the time of application to the substrate. In this second embodiment, the phenolic catalyst functions effectively, and pot-life is not a problem.

As a third alternative, when porous substrates such as wood are being coated, the substrate can be treated with the phenolic catalyst prior to the application of a mixture of polyfunctional-isocyanate and polyfunctional-imine. The catalyst is then present at the substrate-coating interface and is effective in promoting the curing rate.

In any case, about 3 to 5 wet mils of coating is laid down onto the wood substrate (this dries to a film thickness of about 2 to 4 mils). The coating is then dried for about 10 to 15 minutes at temperatures of up to 180 F.; usually temperatures in the range of about 100 to 150° F. are commercially expedient. At curing temperatures below 100° F., time periods of 30 minutes or more may be required to achieve a full, hard cure.

For particularly severe conditions of exterior exposure, two, three or more layers of polyurea can be built up in successive applications to achieve the required performance specification. Under ordinary conditions of outdoor exposure for pine lumber, two layers (each layer 2 dry mils in thickness) are satisfactory. Under these conditions, polyurea acts as a "self-primer."

Alternatively, standard primers such as alkyds, polyesters, acrylics, polyurethanes, epoxies, etc., can be used. Polyurea coatings are then built up on the primer basecoat according to the method described above.

The following examples are illustrative of the practice of the present invention, although they should not be construed as limiting. All parts and percentages are by weight unless otherwise specified.

EXAMPLE 1

A catalyzed polyfunctional-imine/polyfunctionalisocyanate coating solution is prepared by mixing 95 parts of a difunctional ketimine, 105 parts of a difunctional isocyanate, and 50 parts of commercial grade 2-chloro-4 phenylphenol (sold by Dow Chemical under the name of Dowcide 4) in 750 parts of xylene at about 100° F. in a stirred reaction vessel. This solution contains the equivalent of 20% by weight "polyurea."

The difunctional ketimine is a long chain alkylene diimine blocked with methyl isobutyl ketone.

This ketimine has a molecular weight of about 1,100; and an equivalent weight of about 275; and is a clear amber liquid of medium viscosity. It is sold by General Mills under the name "Modified Amine A-100."

The difunctional isocyanate has the formula:

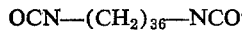
OCN—(CH$_2$)$_{36}$—NCO

This isocyanate has a molecular weight of about 600 and an equivalent weight of about 300. This material is a clear amber liquid of low viscosity and is sold by General Mills under the name "DDI Brand Diisocyanate."

Several pine panels (about 18 inches x 8 inches x 1 inch) are dipped into this coating solution. The coating mixture dries in about ½ hour at 130° F. into a clear, hard, tough, polyurea coating. This coating is suitable for exposure as is; or as a prime coat for subsequent layers of polyurea. Similar results are obtained where methyl phenol (cresol) or 4-chloro-2-cyclopentylphenol (sold by Dow Chemical under the name of "Dowcide 9") is substituted for the 2-chloro-4 phenylphenol in the above procedure.

EXAMPLE 2

A catalyzed polyfunctional-isocyanate/polyfunctional-imine coating solution is prepared by mixing 52.4 parts of the polyfunctional-imine of Example 1 with 57.0 parts of the polyfunctional-isocyanate of Example 1 with 3.6 parts of 3% solution of 2-chloro-4-phenylphenol in 100 parts of xylene.

This solution is sprayed on a glass lens that had been heated to a temperature of about 180° F. A clear, hard, abrasion-resistant film resulted on the glass lens.

EXAMPLE 3

A polyfunctional-imine mixture is prepared by mixing 300 parts of the polyfunctional-imine of Example 1, 590 parts of pigment grade titania powder (Du Pont Grade R-960), and 59 parts of a water suspension of finely divided silica as an extender into 289 parts of xylene at a temperature of about 120° F. Mixing is continued until a stable suspension is achieved.

The resulting suspension was white in color and had the following composition:

|   | Percent |
| --- | --- |
| Polyfunctional-imine | 24 |
| Titania | 47.5 |
| Silica | 5 |
| Xylene | 23.5 |

EXAMPLE 4

A polyfunctional-isocyanate mixture is prepared by mixing 700 parts of the polyfunctional-isocyanate of Example 1 with 76 parts of toluene.

Mixing is carried out at 120° F. until a clear solution results.

EXAMPLE 5

One part of the solution prepared in Example 4 is mixed with 3.1 parts of the suspension prepared in Example 3 to form a coating mixture.

The mixture is sprayed on a pine panel to form a uniform coating of 3 mils wet thickness. The coated panel is cured at about 120° F. in an oven that is open to the ambient. Under these conditions, about 3 hours of curing time are required to fully cure the polyurea coating. The dried coating thickness is about 2 mils.

EXAMPLE 6

The experimental procedure of Example 4 is followed except that 1% of a mixture of 4 and 6-chloro-2 phenylphenol (such as sold by Dow Chemical under the trade name of Dowcide 31 or Dowcide 32) is incorporated into the coating mixture (1% based on the weight of coating mixture).

Under similar curing conditions, a white, hard, tough, glossy, chemically durable polyurea coating of about 2 mils in thickness results in about 20 minutes.

Several coated pine panels prepared according to this example are exposed individually to various chemicals at room temperature, several days. The cured films are not deteriorated by ethanol, methyl isobutyl ketone, mineral spirits, oleic acid, acetic acid, sodium hydroxide, sulfuric acid, toluene, water and xylene.

Similar results can be achieved by mixing the imine component (Example 3) with the isocyanate component (Example 4) in a spray gun equipped with a mixing nozzle. When this technique is employed, the phenolic catalyst can be added to either component.

EXAMPLE 7

Several of the panels prepared in Example 1 are further coated by the method disclosed in Example 6. In this example, the treatment of Example 1 functions as a primer coat. The pigmented coating according to Example 6 cures in about 20 minutes at 120° F. as did the coating in Example 6.

The combined polyurea coating thickness is about 4–5 mils and is extremely glossy, tough and durable. Wood treated in this manner is suited for prolonged periods of outdoor exposure.

EXAMPLE 8

Several untreated pine panels are spray-prime coated using a conventional spray gun and a technique, with 1–2 mils of an ordinary alkyd (phthalic anhydride-glycerol-soybean oil) resin, and are cured at about 140° F. for 20 minutes.

These alkyd-primed panels are then further coated by the method of Example 6, and a dual coated panel having properties similar to the properties of the panels produced in Example 6 is obtained.

EXAMPLE 9

Untreated pine panels (about 18 inches x 8 inches x 1 inch) are soaked in a 5% (by weight) solution of 2 cyclopentyl phenol in xylene, at room temperature, for about 3 to 5 minutes. After this immersion period, the pine panels are allowed to dry overnight at room temperature.

These pine panels are then treated according to the method of Example 5. Surprisingly, these panels require only about ½ hour of curing time to produce a hard, glossy, tough, chemically durable, polyurea coating film. This example demonstrates that the curing of a polyurea film is catalyzed by the presence of 2-cyclopentylphenol on the coated substrate. Apparently, the 2-cyclopentylphenol exerts catalytic influence across the coating-substrate interface.

Similar results are obtained using O-butylphenol, p-ethylphenol, o-isopropylphenol, o-phenylphenol, o-propylphenol, p-cyclohexylphenol and their chlorinated counterparts in place of the 2-cyclopentylphenol.

From the foregoing, it is apparent that a novel method of catalyzing the formation of polyurea coating has been discovered and developed.

The following example demonstrates that a large mass of (as opposed to a film) polyurea can be polymerized by the present methods. Accordingly, it is possible to form solid polyurea articles by casting and other well-known forming techniques using the present invention.

EXAMPLE 10

Part A

Fifteen (15) grams of the mixture of Example 4 are mixed with 54 grams of the mixture of Example 3 in an open reaction vessel at room temperature. After thorough mixing, the reaction mass is allowed to stand at room temperature.

The reaction mass cures to a firm, hard polyurea gel after about 6 hours.

Part B

The method of Part A is repeated for four tests except that a mixture of 4 and 6 chloro-2 phenyl phenol is incorporated into the respective reaction masses in amounts comprising about 0.1%, 0.5% and 2.0% by weight of the reaction mass. It is observed that the time period for formation of a firm, hard polyurea gel decreases with increasing concentration of the phenolic catalyst.

Having thus described the invention, what is claimed is:

1. The process for coating a substrate with a tough, hard, chemically durable polyurea film wherein polyurea is polymerized in situ on said substrate, comprising the steps of:

applying to said substrate a reaction mixture containing a polyfunctional isocyanate of the formula, $$R(N{=}C{=}O)_x$$

wherein R is a saturated hydrocarbyl group having a valence of $x$, wherein $x$ is an integer from 2 to 4; and a polyfunctional imine, said imine comprising the reaction product of an amine of the formula, $$R(NH_2)_x$$

wherein R is a saturated hydrocarbyl group having a valence of $x$, wherein $x$ is an integer from 2 to 4 and a ketone or aldehyde;

curing said reaction mixture to form said polyurea in the presence of an effective catalytic amount of a phenol compound selected from the group consisting of lower hydrocarbyl substituted phenols, lower hydrocarbyl substituted chlorophenols and mixtures thereof whereby the curing rate of said polyurea is materially increased, said lower hydrocarbyl having from one to eight carbon atoms.

2. The process of claim 1 wherein said substrate is a cellulosic substrate.

3. The process of coating a substrate according to claim 1 wherein a plurality of coating layers are superimposed on said substrate, and the exposed layer is a tough, hard, chemically durable polyurea film.

4. The process of claim 1 wherein said phenolic compound is applied to said substrate prior to the application of said reaction mixture.

5. The process of claim 4 wherein said substrate is wood.

6. The process of claim 4 wherein said polyfunctional-isocyanate is an alkylene diisocyanate and said polyfunctional-imine is an alkylene diimine.

References Cited

UNITED STATES PATENTS

| | | | |
|---|---|---|---|
| 3,267,078 | 8/1966 | Damusis | 117—161 KP |
| 3,267,077 | 8/1966 | Windemuth | 117—161 KP |
| 3,511,697 | 5/1970 | Johnson et al. | 117—148 |
| 3,325,346 | 6/1967 | Osborg | 260—77.5 |
| 1,841,420 | 1/1932 | Sperr | 252—426 |
| 2,382,374 | 8/1945 | Wood | 117—147 |
| 3,006,898 | 10/1961 | Walter | 260—858 |

FOREIGN PATENTS

| | | | |
|---|---|---|---|
| 656,950 | 1/1963 | Canada | 117—161 KP |

WILLIAM D. MARTIN, Primary Examiner

W. R. TRENOR, Assistant Examiner

U.S. Cl. X.R.

117—126 AR, 132 B, 138.8 A, 143 A, 148, 161 KP, 161 UH; 252—441; 260—77.56 H